(12) United States Patent
Ogawa et al.

(10) Patent No.: US 7,383,819 B1
(45) Date of Patent: Jun. 10, 2008

(54) ELECTROMAGNETIC VALVE DEVICE AND FUEL INJECTION APPARATUS WITH THE VALVE DEVICE

(75) Inventors: Hisao Ogawa, Kanagawa-ken (JP); Masaki Toda, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/819,092

(22) Filed: Jun. 25, 2007

(30) Foreign Application Priority Data

Dec. 20, 2006 (JP) .............................. 2006-342183

(51) Int. Cl.
*F02M 51/00* (2006.01)
*F02M 51/06* (2006.01)

(52) U.S. Cl. ..................... 123/476; 123/490; 123/506

(58) Field of Classification Search ............... 123/476, 123/472, 478, 490, 506, 459; 251/129.15; 239/585.1, 585.3
See application file for complete search history.

(56) References Cited

U.S. PATENT DOCUMENTS

| | | | | |
|---|---|---|---|---|
| 5,005,803 A | * | 4/1991 | Fritz et al. ............. | 251/129.15 |
| 5,082,180 A | * | 1/1992 | Kubo et al. ................... | 239/88 |
| 5,277,163 A | * | 1/1994 | Ohishi ......................... | 123/467 |
| 5,357,933 A | * | 10/1994 | Kasahara et al. ............ | 123/506 |
| 5,375,575 A | * | 12/1994 | Ohishi et al. ............... | 123/446 |
| 5,443,047 A | * | 8/1995 | Ishiwata et al. ............ | 123/446 |
| 6,758,416 B2 | * | 7/2004 | Earhart et al. ............ | 239/533.2 |
| 2004/0089831 A1 | * | 5/2004 | Chretien et al. ........ | 251/129.15 |
| 2006/0185650 A1 | * | 8/2006 | Kaneko ...................... | 123/506 |

FOREIGN PATENT DOCUMENTS

JP 06-014464 2/1994
JP 07-279792 10/1995

* cited by examiner

*Primary Examiner*—Mahmoud Gimie
(74) *Attorney, Agent, or Firm*—Wenderoth, Lind & Ponack, L.L.P.

(57) ABSTRACT

A compact electromagnetic valve device for fuel injection apparatus for engines is provided with which occurrence of cavitation erosion due to rapid change in pressure in a small gap is prevented without increasing in size. Through holes are drilled in a platy armature connected to a poppet valve for opening and closing a fuel passage connecting a fuel feed/spill passage to a plunger room of a fuel injection apparatus, and a thin plate valve or check valve is provided to the armature to allow the holes to be opened or closed in accordance with upward or down ward movement of the armature connected with the popped valve.

4 Claims, 5 Drawing Sheets

Signal of engine operating condition when the poppet valve has been moved down

ELECTROMAGNETIC VALVE DEVICE AND FUEL INJECTION APPARATUS WITH THE VALVE DEVICE

BACKGROUND OF THE INVENTION

1. Field of the Invention

The present invention relates to an electromagnetic valve device having a platy armature connected to an end of a valve body for opening and closing a fluid passage, a solenoid device which attracts the armature by attraction force generated when a solenoid coil is energized to allow the valve body to close the fluid passage and releases the armature from the attraction force when the energization is shutoff, and a return spring which thrusts back the armature so that the valve body opens the fluid passage when the energization is shutoff, and a fuel injection apparatus equipped with the electromagnetic valve device.

2. Description of the Related Art

An electromagnetic valve device having a platy armature connected to an end of a poppet valve for opening and closing a fuel passage between a plunger room and fuel spill side, a solenoid device which attracts the armature by attraction force generated when a solenoid coil is energized to allow the poppet valve to close the fuel passage and releases the armature from the attraction force when the energization is shutoff, and a spring which thrusts back the armature so that the poppet valve opens the fluid passage when the energization is shutoff, is widely used in unit injector type fuel injection apparatuses for diesel engines. Fuel injection begins when the armature is attracted by the solenoid device by energizing the solenoid coil and the poppet valve closes the fuel passage to bring the plunger room into closeness, and ends when the armature is thrust back by the spring by shutting off the energization so that the poppet valve opens the fuel passage to allow the plunger room to be communicated with the fuel spill side.

One of such electromagnetic valve device is disclosed in Japanese Laid-Open Patent Application No. 7-279792 (patent literature 1).

This electromagnetic valve device has a platy armature connected to an end of a needle valve for opening and closing a fuel passage between a plunger room and fuel spill side, a solenoid device which attracts the armature by attraction force generated when a solenoid coil is energized to allow the needle valve to close the fuel passage and releases the armature from the attraction force when the energization is shutoff, and a spring which thrusts back the armature so that the needle valve opens the fluid passage when the energization is shutoff. With this valve, fuel injection begins when the armature is attracted by the solenoid device by energizing the solenoid coil and the needle valve closes the fuel passage to bring the plunger room into closeness, and ends when the armature is thrust back by the spring by shutting off the energization so that the needle valve opens the fuel passage to allow the plunger room to be communicated with the fuel feed/spill line.

The electromagnetic valve device is composed such that a damper room is formed by an end face of the solenoid device and an end face of the armature with a small gap between them and an armature room is formed by the other end face of the armature and the inner face of the valve casing, and a communicating passage is provided in the valve casing at a side of the armature to communicate the armature room with the damper room, a check valve being provided in the communication passage so that fluid can flow from the armature room to the damper room and not vice versa.

When the needle valve closes the fuel passage, the check valve is closed by increased pressure in the damper room to bring the damper room into closeness, fuel pressure in the damper room rises to slow down downward velocity of the needle valve to allow the needle valve to sit on the valve seat slowly, and occurrence of bouncing of the needle valve which occurs when the needle valve sit on the valve seat at high speed is prevented.

However, when the needle valve moves up to open the fuel passage, pressure in the armature room rises and pressure in the damper room decreased rapidly, so fluid in the armature room flows into the damper room through the check valve at high velocity. Therefore, cavitation erosion tends to occur on the surface of the armature facing the damper room. Further, as the communication passage and check valve are provided in the valve casing at a side position of the armature, the electromagnetic valve device necessarily becomes large in size to prepare a space for the communication passage and check valve.

SUMMARY OF THE INVENTION

The present invention was made in light of the problems mentioned above, and object of the invention is to provide a compact electromagnetic valve device with which occurrence of cavitation erosion due to rapid change in pressure in a small gap is prevented without increasing in size and a fuel injection apparatus equipped with the electromagnetic valve device.

To attain the object, the present invention proposes an electromagnetic valve device comprising a platy armature connected to an end of a valve body for opening and closing a fluid passage, a solenoid device for attracting said armature by attraction force generated by energizing a solenoid coil of said solenoid device when allowing said valve body to close said fluid passage and releasing the attraction force by de-enegizing the solenoid coil when allowing said valve body to be returned to an opening position at which the valve body opens said fluid passage, and a return spring for pushing said valve body to said opening position, wherein through holes are drilled in said armature penetrating from a front surface thereof facing an end surface of said solenoid device to a rear surface thereof, a thin plate valve is attached to said rear surface of said armature to cover said holes, whereby when said armature is attracted by said solenoid device said thin plate valve is bent to open said through holes by pressure exerting on said thin plate valve through said holes from a small gap space between said end face of said solenoid valve device and said front surface of said armature so that said small gap space is brought into communication with an armature room where said armature is located, and when said armature returns to said opening position pushed by said return spring said thin plate valve recovers its original position to close said holes.

A fuel injection apparatus equipped with an electromagnetic valve device as mentioned above is composed such that a plunger room thereof is discommunicated or communicated with a fuel feed/spill passage when a poppet valve as said valve body is seated on or departed from a seat face of a valve seat, whereby fuel injection begins when said solenoid device is energized so that said poppet valve closes said fluid passage to shutoff communication between said plunger room and said fuel feed/spill passage, and fuel injection ends when said solenoid device is de-energized so that said poppet valve opens said fluid passage pushed by said return spring to bring said plunger room into communication with said fuel feed/spill passage.

According to the invention, when allowing fuel injection to be begun by a fuel injection apparatus of engine, pressure in the small gap between the end surface of the solenoid core and the upper surface of the armature facing the end surface of the solenoid core increases as the armature is attracted upward to allow the poppet valve to be closed, the through holes in the platy armature are opened through bending of the thin plate valve which is attached to the rear surface of the armature to cover the holes pushed by the raised pressure in the small gap exerting on the thin plate valve through the holes, and the pressure in the small gap is bled in to the armature room.

Therefore, in the course of upward moving of the poppet valve until it is closed, bending of the thin plate valve increases due to increased pressure in the small gap and flowage of fluid from the small gap through the holes increases, so rising of pressure in the gap 33 becomes slower as the poppet valve moves up. When the armature moves down, pressure in the small gap decreases and the through holes are closed by the thin plate valve, so rapid downward movement of the armature is prevented, the armature moves down slowly, and occurrence of cavitation on the upper surface of the armature is prevented.

The invention also proposes an electromagnetic valve device comprising a platy armature connected to a valve body for opening and closing a fluid passage, a solenoid device for attracting said armature by attraction force generated by energizing a solenoid coil of said solenoid device when allowing said valve body to close said fluid passage and releasing the attraction force by de-enegizing the solenoid coil when allowing said valve body to be returned to an opening position at which the valve body opens said fluid passage, and a return spring for pushing said valve body to said opening position, wherein through holes are drilled in said armature penetrating from a front surface thereof facing an end surface of said solenoid device to a rear surface thereof, a check valve is provided at a connecting part of said armature to said valve body to open or close said holes so that a small gap space between said end face of said solenoid valve device and said front surface of said armature is communicated or discommunicated with an armature room where said armature is located, whereby when said armature is attracted by said solenoid device to be moved upward said check valve opens said holes pushed by pressure in said small gap space increased by upward movement of said armature aided by negative pressure generated in said central hollow of said poppet valve due to upward movement thereof so that said small gap space is brought into communication with said armature room, and when said valve body is moved down by said return spring said check valve closes said holes pushed by a return spring of said check valve aided by positive pressure generated in said central hollow of said poppet valve due to downward movement thereof so that said small gap space is brought into discommunication with said armature room.

A fuel injection apparatus equipped with an electromagnetic valve device as mentioned above is composed such that a plunger room thereof is discommunicated or communicated with a fuel feed/spill passage when a poppet valve as said valve body is seated on or departed from a seat face of a valve seat, whereby fuel injection begins when said solenoid device is energized so that said poppet valve closes said fluid passage to shutoff communication between said plunger room and said fuel feed/spill passage, and fuel injection ends when said solenoid device is de-energized so that said poppet valve opens said fluid passage pushed by said return spring to bring said plunger room into communication with said fuel feed/spill passage.

According to the invention, when allowing fuel injection to be begun by a fuel injection apparatus of engine, pressure in the small gap between the end surface of the solenoid core and the upper surface of the armature facing the end surface of the solenoid device increases as the armature is attracted upward to allow the poppet valve to be closed, the check valve provided at a connecting part of the armature to the valve body is opened by pressure in the small gap space increased by upward movement of said armature, fluid in the small gap space can flow into the armature room, and pressure in the small gap space is bled in to the armature room.

Therefore, in the course of upward moving of the poppet valve until it is closed, flowage of fluid from the small gap through the central hole and slanted holes into the plunger room increases and rising of pressure in the small gap becomes slower as the poppet valve moves upward, and rapid pressure drop when the poppet valve moves down to end fuel injection is evaded and occurrence of cavitation erosion on the upper surface of the armature can be prevented.

DETAILED DESCRIPTION OF THE PREFERRED EMBODIMENTS

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 5:
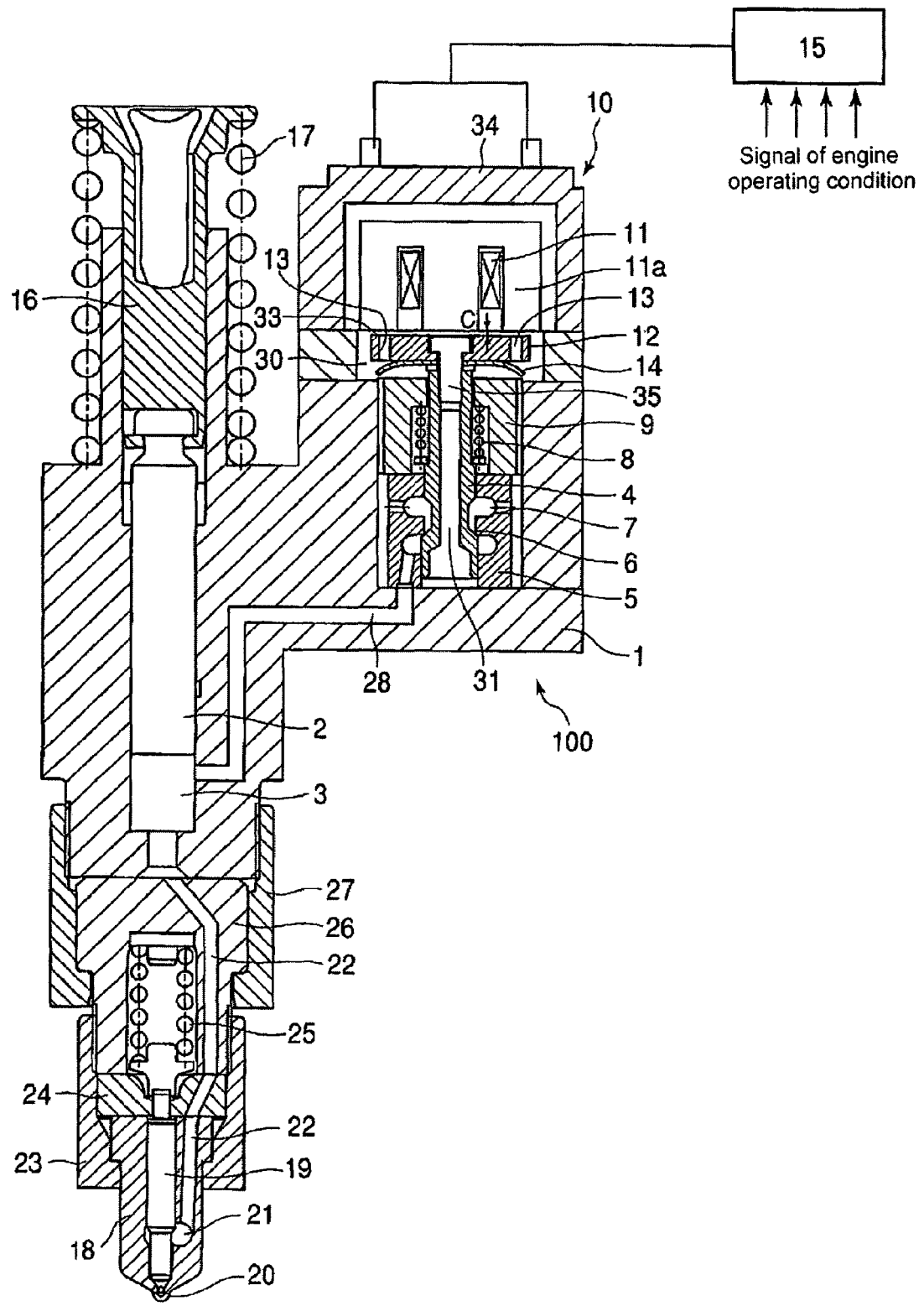
FIG. 5 is a longitudinal sectional view of the unit injector for a diesel engine to which the electromagnetic valve device of the present invention is applied.

FIG. 5 is a longitudinal sectional view of the unit injector for a diesel engine to which the electromagnetic valve device of the present invention is applied.

Referring to FIG. 5, in its injector body 1, the unit injector 100 has a plunger 2 fitted slidably which is reciprocated by means of a fuel cam not shown in the drawing via a tappet 16 and a tappet spring 17. Fuel is supplied to a plunger room 3 through a fuel passage 28 when a poppet valve 4 is opened. When the poppet valve 4 is closed, fuel in the plunger room 3 is compressed to high pressure by moving down of the plunger 2 to be sent forth through a fuel passage 22 toward the fuel pool 21. The high pressure fuel reached the fuel pool 21 pushes up a needle valve 19 against the spring load of a needle spring 25. When the needle valve 19 is thus opened, high pressure fuel in the fuel pool 21 is injected into a combustion chamber not shown in the drawing through injection holes 20 provided at the apical end part of a nozzle chip 18 to be burned in the combustion chamber.

The nozzle chip 18 is held fluid tight to a spring case 26 via a spacer 24 by screw-tightening a nozzle nut 23 to a spring case 26. The spring case 26 is screw-tightened to the injector body 1 by a fixing nut 27.

Injection timing of high pressure fuel compressed by the plunger 2 is controlled by means of an electromagnetic valve device 10.

In the electromagnetic valve device 10, a solenoid core 11a having a solenoid coil 11 in it, and a platy armature 12 located in an armature room 30 below the solenoid core 11a with a small gap 33 from the lower end face of the solenoid core 11a are provided. The armature 12 is fixed with a fixing screw 35 to the upper end of a poppet valve 4 which is fit for reciprocation in a through hole of a valve seat 5. The poppet valve 4 is formed to be a hollow body having a central hollow 31. A solenoid case 34 covers the solenoid core 11a.

A solenoid controller 15 controls energization and de-enegization of the solenoid coil 11. When the solenoid coil is energized, the armature 12 is attracted by attraction force generated by the energization toward the solenoid core 11a to allow the poppet valve 4 to be seated on a seat face 6 of the valve seat 5 (value of the small gap 33 is C when the poppet valve 4 is seated). By the seating of the poppet valve 4, a fuel passage 28 to the plunger room 3 is closed and fuel injection begins.

When energization of the solenoid coil 11 is shutoff by the solenoid controller 15, the armature 12 and the poppet valve 4 fixed thereto are pushed down by a poppet valve spring (return spring) 8, the poppet valve 4 departs from the seat face 6 to open the fuel passage 28. By the opening of the poppet valve 4, the fuel passage 28 communicating with the plunger room 3 is communicated with a fuel spill room 32 (see FIG. 1) and fuel spill port 7 communicating with a fuel passage not shown in the drawing to feed fuel to the unit injector 100 from a fuel feed pump not shown in the drawing, pressure in the plunger room 3 decreases rapidly, and fuel injection ends.

The present invention relates to the electromagnetic valve device composed as mentioned above.

The First Embodiment

Figure 1:
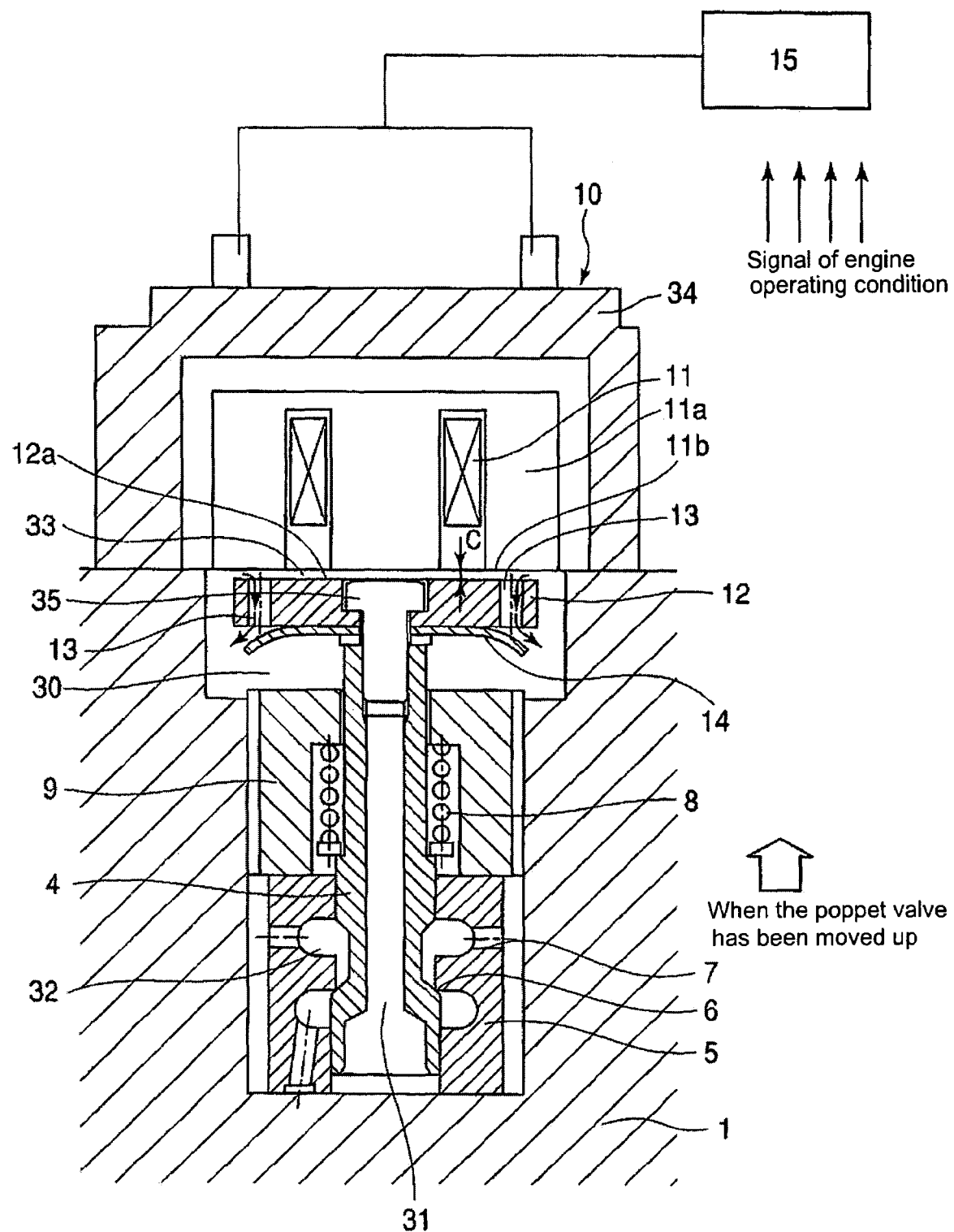
FIG. 1 is a longitudinal sectional view of a first embodiment of the invention of the electromagnetic valve device for an electromagnetic controlled unit injector for a diesel engine showing when the poppet valve has been moved up.
Figure 2:
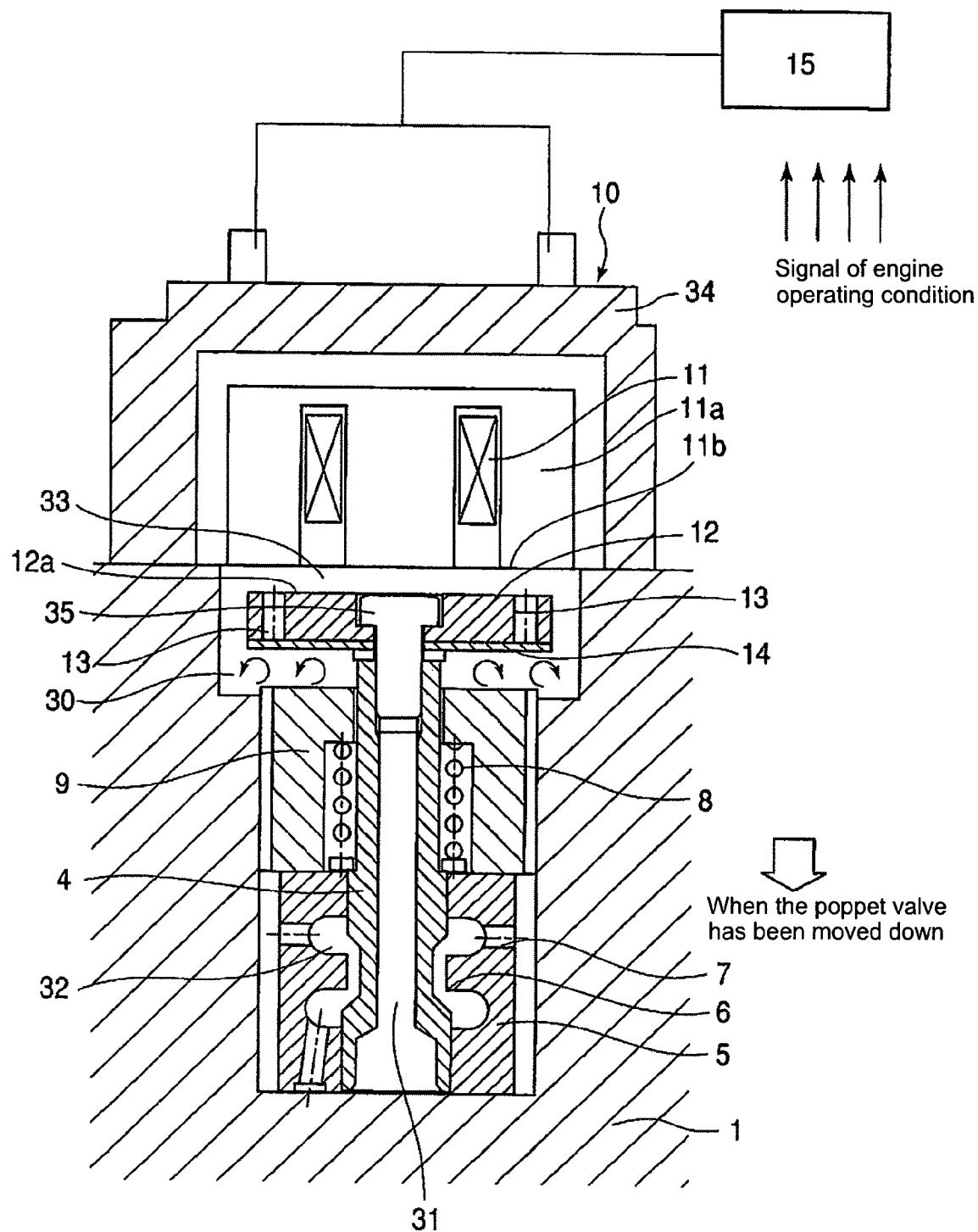
FIG. 2 is a drawing as in FIG. 1 of the first embodiment when the poppet valve has been moved down.

FIG. 1 is a longitudinal sectional view of a first embodiment of the invention of the electromagnetic valve device for an electromagnetic controlled unit injector for a diesel engine showing when the poppet valve has been moved up, and FIG. 2 is a drawing as in FIG. 1 of the first embodiment when the poppet valve has been moved down.

Referring to FIGS. 1 and 2, through holes 13 are drilled in the armature 12 penetrating the armature 12 from the upper surface 12a thereof facing the end surface 11b of the solenoid core 11a to the rear surface near the outer periphery of the armature 12 such that distance from the center of the armature to each of the holes is the same or near the same to each other.

A flexible thin plate valve 14 and made of stainless steel or plastic material to have spring function is attached to the rear surface of the armature 12. The thin plate valve 14 is fixed at its central part to the rear surface of the armature 12 by the fixing screw 35 together with the poppet valve 4 so that the central part is a fixed end and the peripheral part is a free end.

When the solenoid coil 11 is energized by a signal sent from the solenoid controller 15 based on engine operating conditions such as engine rotation speed and engine loads, the armature 12 is attracted by attraction force generated by the energization toward the solenoid core 11a to allow the poppet valve 4 to be seated on a seat face 6 of the valve seat 5 (value of the small gap 33 is C when the poppet valve 4 is seated) as shown in FIG. 1. When the poppet valve 4 is seated on the seat face 6, a fuel passage 28 to the plunger room 3 is closed and fuel injection begins.

When the armature 12 fixed to the poppet valve 4 moves up, pressure in the gap 33 between the end surface 11b of the solenoid core 11a and the upper surface 12a of the armature 12 rises and the peripheral part of the thin plate valve 14 is bent by the raised fuel pressure exerting through the holes 13 on the peripheral part of the thin plate valve 14 as shown in FIG. 1, and the fuel in the small gap 33 escapes toward the armature room 30 so that pressure does not rise excessively in the small gap 33. By this, the poppet valve fixed to the armature can be moved up rapidly.

In the course of upward moving of the poppet valve 4 until it is seated on the seat face 6 to close the fuel passage 28, bending of the thin plate valve 14 increases due to increased pressure in the small dap 33 and flowage of fluid from the small gap 33 through the holes 13 increases, so rising of pressure in the gap 33 becomes slower as the poppet valve 4 moves up.

When energization of the solenoid coil 11 is shutoff by the solenoid controller 15 to end fuel injection, the armature 12 fixed to the poppet valve 4 is pushed down by the poppet valve spring (return spring) 8 to open the poppet valve 4 as shown in FIG. 2, pressure in the small gap 33 reduces and the thin plate valve 14 restores its original state to close the holes 13. Therefore, rapid downward movement of the poppet valve 4 is suppressed and rapid pressure drop in the small gap 33 is prevented.

Accordingly, occurrence of cavitation erosion on the surface of the armature 12 can be prevented, which is experienced in the prior art.

In FIGS. 1 and 2, constituent parts the same as those of FIG. 5 are denoted by the same reference numerals.

The Second Embodiment

Figure 3:
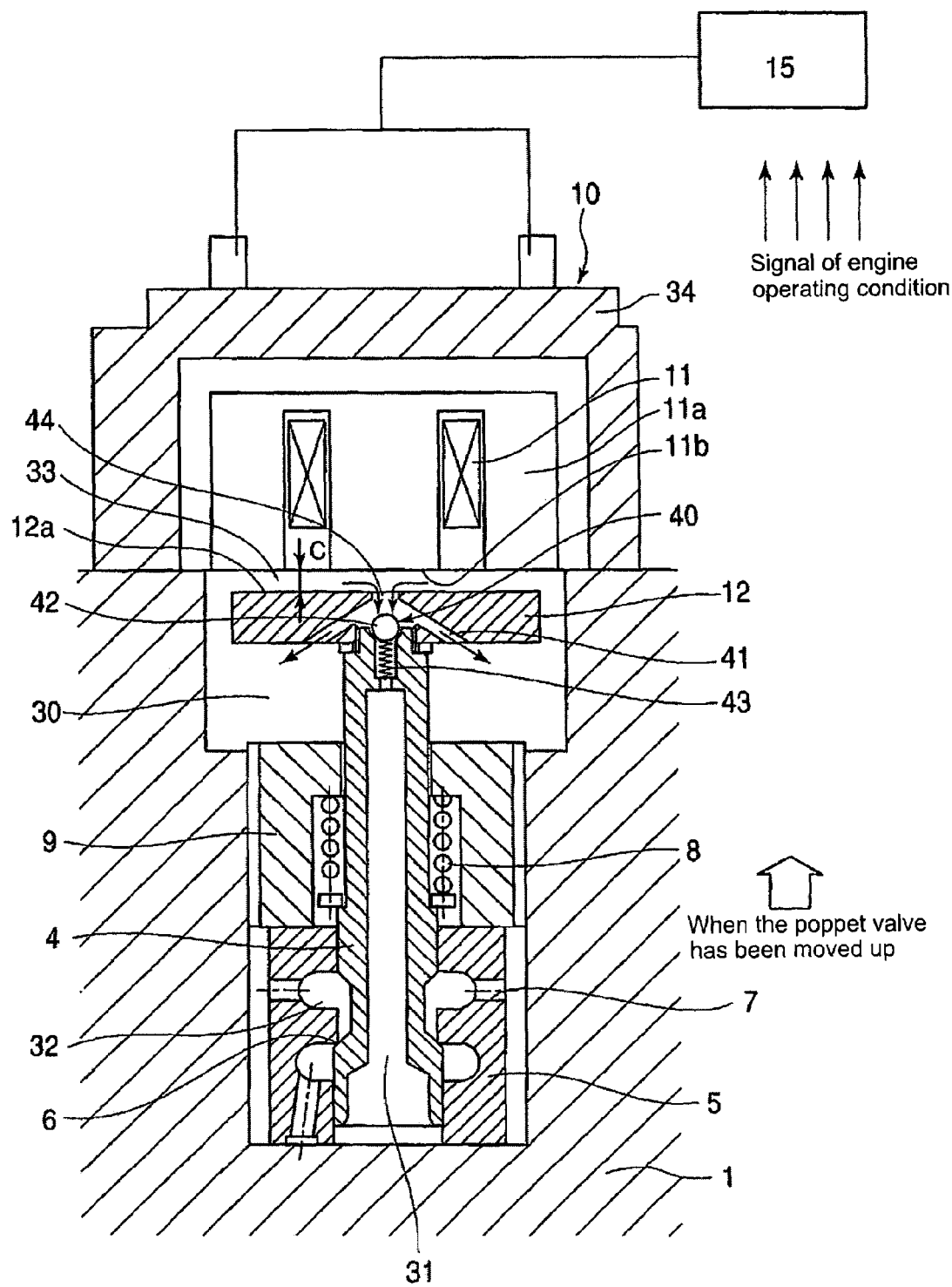
FIG. 3 is a longitudinal sectional view of a second embodiment of the invention of the electromagnetic valve device for an electromagnetic controlled unit injector for a diesel engine showing when the poppet valve has been moved up.
Figure 4:
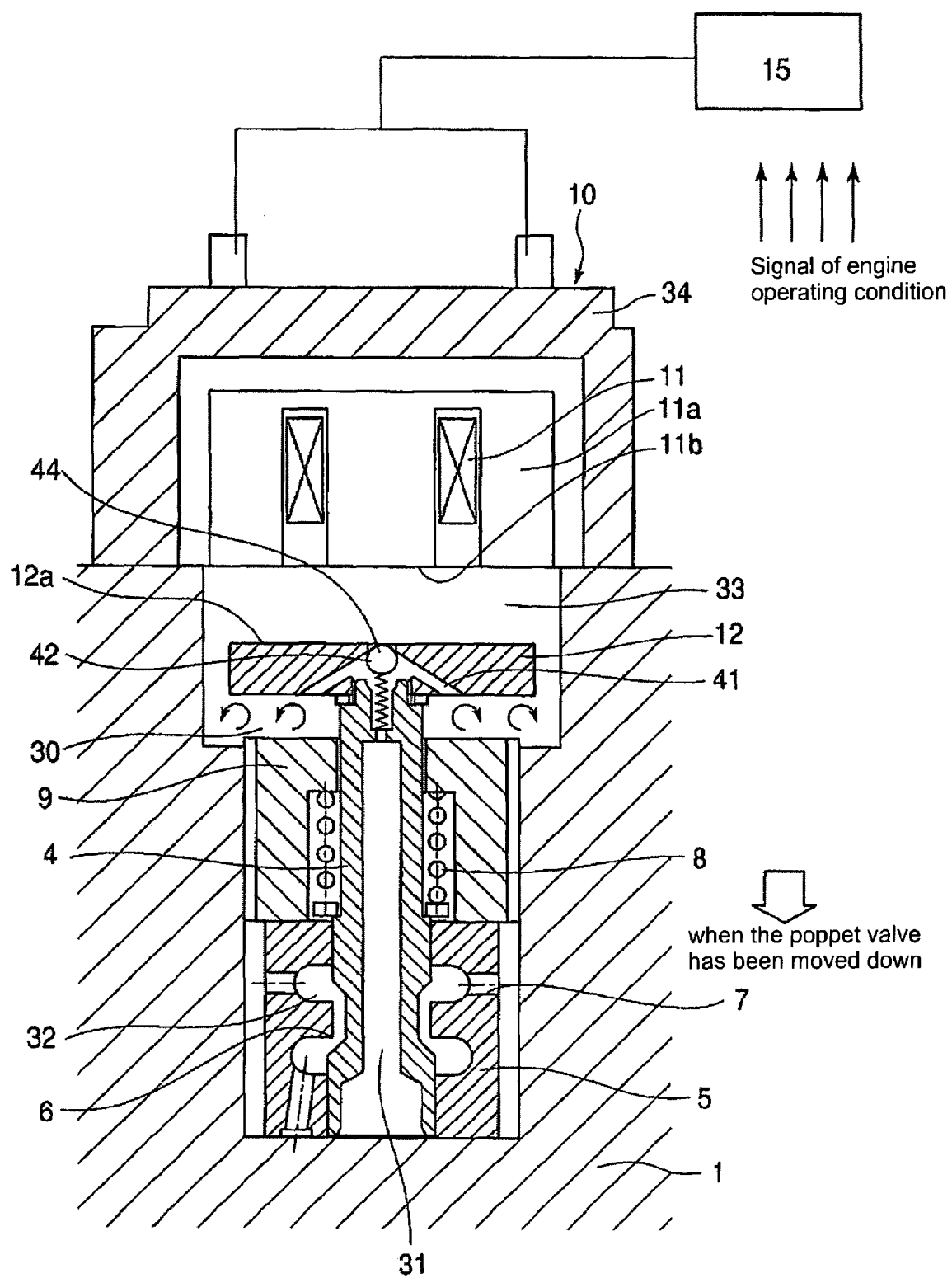
FIG. 4 is a drawing as in FIG. 2 of the second embodiment when the poppet valve is moving down.

FIG. 3 is a longitudinal sectional view of a second embodiment of the invention of the electromagnetic valve device for an electromagnetic controlled unit injector for a diesel engine showing when the poppet valve has moved up, and FIG. 4 is a drawing as in FIG. 1 of the first embodiment when the poppet valve has moved down.

In the second embodiment, a central through hole 44 and two outwardly downward slanting holes 41 communicating with the central hole 44 are provided to the armature 12. The upper end part of the poppet valve 4 is screwed into the rear side of the armature to be fixed thereto.

A check valve 40 is provided at the upper end of the poppet valve 4 having the central hollow 31.

The check valve 40 includes a spherical valve body 42 and a return spring 43 energizing the spherical valve body 42 upward. The check valve 40 opens and closes the central hole 44 and slanting holes 41 and also opens and closes the opening of the central hollow 31 at the upper end of the poppet vale 4. The spherical valve body 42 of the check valve opens the central hole 44 and slanting holes 41 when pressure above the upper surface 12a of the armature 12 rises as mentioned later.

When the solenoid coil 11 is energized by a signal sent from the solenoid controller 15 based on engine operating conditions such as engine rotation speed and engine loads, the armature 12 is attracted by attraction force generated by the energization toward the solenoid core 11a to allow the poppet valve 4 to be seated on a seat face 6 of the valve seat 5 (value of the small gap 33 is C when the poppet valve 4 is seated) as shown in FIG. 3. When the poppet valve 4 is seated on the seat face 6 and closes the fuel passage 28, a fuel passage 28 to the plunger room 3 is closed and fuel injection begins.

When the armature 12 fixed to the poppet valve 4 moves up to close the poppet valve 4, the small gap 33 between the end surface 11b of the solenoid core 11a and the upper surface 12a of the armature 12 decreases and pressure in the small gap 33 increases, on the other hand pressure in the space including the central hollow 31 of the poppet valve 4 and space under the lower end of the poppet valve 4 increases in volume and decreases in pressure to negative pressure.

Therefore, spherical valve body 42 of the check valve 40 provided at the upper end of the poppet valve 4 is pushed down by the difference between the positive pressure in the small gap 33 and the negative pressure in the central hollow 31 against spring force of the return spring 42, and the central hole 44 is opened.

By this, fluid in the small gap 33 flows through the central hole 44 and slanted holes 41 into the armature room 30 and pressure in the small gap 33 is bled in to the armature room 30.

Therefore, in the course of upward moving of the poppet valve 4 until it is seated on the seat face 6 to close the fuel passage 28, flowage of fluid from the small gap 33 through the holes 44, 41 into the armature room 30 increases and rising of pressure in the small gap 33 becomes slower as the poppet valve 4 moves upward, and the poppet valve 4 is moved up swiftly without excessively rapid moving up.

When energization of the solenoid coil 11 is shutoff by the solenoid controller 15 to end fuel injection, the armature 12 fixed to the poppet valve 4 is pushed down by the poppet valve spring 8 to open the poppet valve 4 as shown in FIG. 4, pressure in the small gap decreases by moving down of the armature 12 and the spherical valve body 42 of the check valve 40 is pushed upward by the return spring 43 to close the central hole 44, aided by positive pressure in the central hollow generated by downward movement of the poppet valve 4 because the space including the central hollow and space under the lower end of the poppet valve 4 decreases in volume and increase in pressure. Therefore, rapid downward movement of the poppet valve 4 is suppressed and rapid pressure drop in the small gap 33 is prevented.

Accordingly, occurrence of cavitation erosion on the surface of the armature 12 can be prevented, which is experienced in the prior art.

In FIGS. 3 and 4, constituent parts the same as those of FIG. 5 are denoted by the same reference numerals. According to the first and second embodiments, space for providing a communicating passage and a check valve is not needed to be provided in the casing at a side of the armature as is in the prior art disclosed in the patent literature 1, and the electromagnetic valve device 10 of compact and requiring less installation space and having effect mentioned above can be obtained, by composing such that through holes 13 are provided near the peripheral part of the platy armature 12 to penetrate the armature 12 from the upper surface 12a to the rear surface thereof and the thin plate valve 14 is attached to the rear surface of the armature 12 to cover the holes 13 in the first embodiment, or the central hole 44 and slanting holes 41 are formed in the armature 12 and the poppet valve 4 is screwed into the armature 12 at the upper end part of the poppet valve 4 where the check valve 40 is provided to open or close the central hole 44 in the second embodiment.

Further, in the first and second embodiments, it is not needed to compose such that the outer periphery of the armature slides contacting to the armature guide surface of the valve body liquid tight as is in the prior art disclosed in the patent literature 1, so a large gap is permitted to be provided between the outer periphery of the armature and the inner surface of the casing surrounding the armature.

Therefore, high machining accuracy is not needed in machining the outer periphery of the armature and inner surface of the casing surrounding the armature as is in the patent literature 1, and machining cost can be reduced.

While two embodiments of the invention have been illustrated and described in detail, it is understood that the invention is not limited thereto and can be applied widely to electromagnetic valve devices having an armature and a valve body such as a sleeve, etc.

According to the invention, when allowing fuel injection to be begun by a fuel injection apparatus of engine, pressure in the small gap between the end surface of the solenoid core and the upper surface of the armature facing the end surface of the solenoid core increases as the armature is attracted upward to allow the poppet valve to be closed, the through holes in the armature near the peripheral part thereof are opened through bending of the thin plate valve attached to the rear surface of the armature to cover the holes pushed by the raised pressure in the small gap exerting on the thin plate valve through the holes, and the pressure in the small gap is bled in to the armature room.

Therefore, in the course of upward moving of the poppet valve until it is closed, bending of the thin plate valve increases due to increased pressure in the small gap and flowage of fluid from the small gap through the holes increases, so rising of pressure in the gap 33 becomes slower as the poppet valve moves up. When the armature moves down, pressure in the small gap decreases and the through holes are closed by the thin plate valve, so rapid downward movement of the armature is prevented, the armature moves down slowly, and occurrence of cavitation on the upper surface of the armature is prevented.

Further, according to the invention, when allowing fuel injection to be begun by a fuel injection apparatus of engine, pressure in the small gap between the end surface of the solenoid core and the upper surface of the armature facing the end surface of the solenoid core increases as the armature is attracted upward to allow the poppet valve to be closed, the check valve provided at the upper end of the poppet valve screwed into the armature opens the center hole at the top of the poppet valve the raised pressure in the small gap to allow fluid in the small gap to flow through the central hole and slanted holes communicating to the center hole, and pressure in the small gap is bled in to the armature room.

Therefore, in the course of upward moving of the poppet valve until it is closed, flowage of fluid from the small gap through the central hole and slanted holes into the armature room increases and rising of pressure in the small gap becomes slower as the poppet valve moves upward, and rapid pressure drop when the poppet valve moves down to end fuel injection is evaded and occurrence of cavitation erosion on the upper surface of the armature can be prevented.

In the electromagnetic valve device disclosed in the patent literature 1, it is necessary to compose such that the clearance between the periphery of the armature and the inner surface of the casing is extremely small in order to form a closed space between the end face of the solenoid core and the face of the armature facing the end face of the solenoid core at the end of the poppet valve closing, high machining accuracy is required. On the contrary, according to the present invention, it is not needed to form the small gap space to be a closed space, a large clearance is permitted between the periphery of the armature and the inner surface of the casing surrounding the armature, high machining accuracy in not needed, and machining cost is reduced.

Further, according to the invention, space for providing a communicating passage and a check valve is not needed to be provided in the casing at a side of the armature as is in the prior art disclosed in the patent literature 1, and an electromagnetic valve device of compact and requiring less installation space and having effect mentioned above can be obtained, by composing such that through holes are provided near the peripheral part of the platy armature to penetrate the armature from the upper surface to the rear surface thereof and a thin plate valve is attached to the rear surface of the armature to cover the through holes, or a central hole and slanting holes communicating to the central hole are formed in the armature and the poppet valve is screwed into the armature at the upper end part thereof where a check valve is provided

The invention claimed is:

1. An electromagnetic valve device comprising a platy armature connected to an end of a valve body for opening and closing a fluid passage, a solenoid device for attracting said armature by attraction force generated by energizing a solenoid coil of said solenoid device when allowing said valve body to close said fluid passage and releasing the attraction force by de-enegizing the solenoid coil when allowing said valve body to be returned to an opening position at which the valve body opens said fluid passage, and a return spring for pushing said valve body to said opening position, wherein through holes are drilled in said armature penetrating from a front surface thereof facing an end surface of said solenoid device to a rear surface thereof, a thin plate valve is attached to said rear surface of said armature to cover said holes, whereby when said armature is attracted by said solenoid device said thin plate valve is bent to open said through holes by pressure exerting on said thin plate valve through said holes from a small gap space between said end face of said solenoid valve device and said front surface of said armature so that said small gap space is brought into communication with an armature room where said armature is located, and when said armature returns to said opening position pushed by said return spring said thin plate valve recovers its original position to close said holes.

2. A fuel injection apparatus for engines equipped with an electromagnetic valve of claim 1, wherein the apparatus is composed such that a plunger room thereof is discommunicated or communicated with a fuel feed/spill passage when a poppet valve as said valve body is seated on or departed from a seat face of a valve seat, whereby fuel injection begins when said solenoid device is energized so that said poppet valve closes said fluid passage to shutoff communication between said plunger room and said fuel feed/spill passage, and fuel injection ends when said solenoid device is de-energized so that said poppet valve opens said fluid passage pushed by said return spring to bring said plunger room into communication with said fuel feed/spill passage.

3. An electromagnetic valve device comprising a platy armature connected to a valve body for opening and closing a fluid passage, a solenoid device for attracting said armature by attraction force generated by energizing a solenoid coil of said solenoid device when allowing said valve body to close said fluid passage and releasing the attraction force by de-enegizing the solenoid coil when allowing said valve body to be returned to an opening position at which the valve body opens said fluid passage, and a return spring for pushing said valve body to said opening position, wherein through holes are drilled in said armature penetrating from a front surface thereof facing an end surface of said solenoid device to a rear surface thereof, a check valve is provided at a connecting part of said armature to said valve body to open or close said holes so that a small gap space between said end face of said solenoid valve device and said front surface of said armature is communicated or discommunicated with an armature room where said armature is located, whereby when said armature is attracted by said solenoid device to be moved upward said check valve opens said holes pushed by pressure in said small gap space increased by upward movement of said armature aided by negative pressure generated in said central hollow of said poppet valve due to upward movement thereof so that said small gap space is brought into communication with said armature room, and when said valve body is moved down by said return spring said check valve closes said holes pushed by a return spring of said check valve aided by positive pressure generated in said central hollow of said poppet valve due to downward movement thereof so that said small gap space is brought into discommunication with said armature room.

4. A fuel injection apparatus for engines equipped with an electromagnetic valve device of claim 3, wherein the apparatus is composed such that a plunger room thereof is discommunicated or communicated with a fuel feed/spill passage when a poppet valve as said valve body is seated on or departed from a seat face of a valve seat, whereby fuel injection begins when said solenoid device is energized so that said poppet valve closes said fluid passage to shutoff communication between said plunger room and said fuel feed/spill passage, and fuel injection ends when said solenoid device is de-energized so that said poppet valve opens said fluid passage pushed by said return spring to bring said plunger room into communication with said fuel feed/spill passage.

* * * * *